US009491792B2

(12) United States Patent
Yao

(10) Patent No.: US 9,491,792 B2
(45) Date of Patent: Nov. 8, 2016

(54) METHOD, APPARATUS, AND SYSTEM FOR MEASUREMENT FOR DEVICE-TO-DEVICE COMMUNICATION

(71) Applicant: HUAWEI TECHNOLOGIES CO., LTD., Shenzhen (CN)

(72) Inventor: Zongming Yao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/659,904

(22) Filed: Mar. 17, 2015

(65) Prior Publication Data
US 2015/0189685 A1 Jul. 2, 2015

Related U.S. Application Data

(63) Continuation of application No. PCT/CN2013/077292, filed on Jun. 17, 2013.

(30) Foreign Application Priority Data

Sep. 17, 2012 (CN) .......................... 2012 1 0344206

(51) Int. Cl.
H04W 24/08 (2009.01)
H04W 76/02 (2009.01)
H04W 88/06 (2009.01)

(52) U.S. Cl.
CPC ........... H04W 76/023 (2013.01); *H04W 24/08* (2013.01); *H04W 88/06* (2013.01)

(58) Field of Classification Search
CPC ... H04W 88/06; H04W 92/02; H04W 88/02; H04W 68/00; H04W 76/02; H04W 76/023; H04W 24/08
See application file for complete search history.

(56) References Cited

U.S. PATENT DOCUMENTS

2011/0258327 A1 10/2011 Phan et al.
2011/0268101 A1* 11/2011 Wang .................... H04L 5/0053
370/344

(Continued)

FOREIGN PATENT DOCUMENTS

| CH | 102340876 | 2/2012 |
|----|-----------|--------|
| CN | 101471829 A | 7/2009 |
| CN | 102550117 | 7/2012 |
| CN | 102630390 | 8/2012 |

OTHER PUBLICATIONS

PCT International Search Report dated Sep. 19, 2013 in corresponding International Patent Application No. PCT/CN2013/077292.

(Continued)

*Primary Examiner* — Ted Wang
(74) *Attorney, Agent, or Firm* — Staas & Halsey LLP

(57) ABSTRACT

Embodiments of the present invention disclose a method, apparatus, and system for measurement for D2D communication, used to reduce blindness of measurement in a mechanism of D2D communication between terminals. The method in an embodiment of the present invention includes: sending directly or forwarding, by an access point to a wireless network management entity, a consulting message for D2D communication between terminals; requesting the wireless network management entity to calculate a performance evaluation parameter for D2D communication between the terminals, so as to evaluate feasibility of measurement for D2D communication between the terminals; determining, according to a received performance evaluation parameter for D2D communication between the terminals, to perform the measurement for D2D communication between the terminals, and performing measurement configuration for the terminals; and determining, according to a result of the measurement for D2D communication between the terminals, to perform D2D communication between the terminals.

19 Claims, 9 Drawing Sheets

(56) References Cited

U.S. PATENT DOCUMENTS

| | | | |
|---|---|---|---|
| 2011/0319122 A1* | 12/2011 | Zhou | H04W 52/146 455/522 |
| 2012/0015607 A1 | 1/2012 | Koskela et al. | |
| 2012/0184306 A1* | 7/2012 | Zou | H04W 76/023 455/458 |
| 2012/0243437 A1* | 9/2012 | Horn | H04W 76/023 370/254 |
| 2012/0302254 A1 | 11/2012 | Charbit et al. | |

OTHER PUBLICATIONS

International Search Report mailed Sep. 19, 2013 in corresponding International Application No. PCT/2013/077292.

Chinese Office Action dated Mar. 25, 2016 in corresponding Chinese Patent Application No. 201210344206.7.

* cited by examiner

METHOD, APPARATUS, AND SYSTEM FOR MEASUREMENT FOR DEVICE-TO-DEVICE COMMUNICATION

CROSS REFERENCE

This application is a continuation of International Application No. PCT/CN2013/077292, filed on Jun. 17, 2013, which claims priority to Chinese Patent Application No. 201210344206.7, filed on Sep. 17, 2012, both of which are hereby incorporated by reference in their entireties.

TECHNICAL FIELD

The present invention relates to the field of communications technologies, and in particular, to a method, apparatus, and system for measurement for device-to-device communication.

BACKGROUND

Mobile communications networks are developing towards a higher data transmission rate, a higher resource utilization rate, and a higher network capacity, which imposes higher requirements on future wireless spectrum resources. However, wireless spectrum resources available for mobile communications are limited; therefore, how to implement a high rate and a high capacity by using limited bandwidth resources becomes a focus of industry research. A device-to-device (D2D) communications technology may be applied to a mobile cellular network to increase the resource utilization rate and network capacity.

In the prior art, a decision process for establishing D2D communication between terminals (UE) in a traditional cellular network is specifically as follows: UE1 sends a request for establishing D2D communication between UE1 and UE2 to a base station (BS); the BS checks whether UE1 and UE2 are both attached to the BS; if either UE1 or UE2 is not attached to the BS, the BS directly returns an error and terminates the decision process; and if both UE1 and UE2 are attached to the BS, the BS sends a measurement request to UE1 and UE2 for UE1 and UE2 to perform measurement. It should be noted that, before the measurement, UE1 and UE2 perform corresponding measurement configuration according to configuration information that is for D2D communication measurement and is in the measurement request. UE1 and UE2 return a measurement response message that includes measurement information to the BS. UE1 and UE2 may further return, to the BS by using the measurement response message, information that is obtained by performing measurement on communication quality of a macro cellular network. The BS determines, according to a result of the measurement, whether to agree to establish D2D communication between UE1 and UE2.

However, in the prior art above, information that is about a wireless network environment and is obtained by the BS and the UEs by simple measurement is limited, and blindness of measurement is easily caused by complexity and variability of the wireless network environment itself; as a result, after the BS learns a result of D2D measurement between the UEs, a determining result may be that D2D communication cannot be established between the UEs, which wastes time and network resources (for example, a frequency spectrum, and energy of the BS and the UEs). In addition, the prior art is limited to UEs attached to a same BS and if UE1 and UE2 are attached to different BSs, establishing D2D communication between UE1 and UE2 is not allowed even if UE1 and UE2 belong to a same operator and a distance between UE1 and UE2 is small. For UEs that support multiple radio access technologies, a most appropriate radio access technology for data transmission of D2D communication between the UEs can be determined only after simple measurement is performed on the different radio access technologies and measurement results are compared. This also causes a waste of time, electricity, and resources in the process of establishing a D2D connection.

SUMMARY

Embodiments of the present invention provide a method, apparatus, and system for measurement for D2D communication, which are used to save measurement time and bandwidth resources when D2D communication is established between terminals.

A first aspect of the present invention provides a method for measurement for D2D communication, including: sending directly or forwarding, by an access point to a wireless network management entity, a consulting message for D2D communication between terminals, where the consulting message is used to request the wireless network management entity to calculate a performance evaluation parameter for D2D communication between the terminals, where the performance evaluation parameter for D2D communication between the terminals is used to evaluate feasibility of measurement for D2D communication between the terminals; receiving a performance evaluation parameter for D2D communication between the terminals that is sent by the wireless network management entity; determining, according to the performance evaluation parameter for D2D communication between the terminals, to perform the measurement for D2D communication between the terminals, and performing measurement configuration for the terminals; and determining, according to a result of the measurement for D2D communication between the terminals, to perform D2D communication between the terminals.

In a first possible implementation manner, the determining, according to the performance evaluation parameter for D2D communication between the terminals, to perform the measurement for D2D communication between the terminals includes: determining whether a value of the performance evaluation parameter for D2D communication between the terminals is greater than a preset threshold of the performance parameter; and if the value of the performance evaluation parameter for D2D communication between the terminals is greater than the preset threshold of the performance parameter, determining to perform the measurement for D2D communication between the terminals.

With reference to the first aspect or the first possible implementation manner of the first aspect, in a second possible implementation manner, before the sending directly or forwarding, to a wireless network management entity, a consulting message for D2D communication between terminals, the method includes: acquiring device information of an attached terminal, where the device information of the terminal includes capability information and location information of the terminal, where the capability information of the terminal includes a supported radio access technology, a supported frequency range, and a maximum transmit power of the terminal; and sending the device information of the terminal to the wireless network management entity.

With reference to the second possible implementation manner of the first aspect, in a third possible implementation manner, the acquiring device information of an attached terminal includes: periodically receiving the device information reported by the attached terminal; or in a process that the attached terminal establishes, with another terminal, data communication that is based on the access point itself, acquiring the device information reported by the attached terminal.

A second aspect of the present invention provides a method for measurement for D2D communication, including: receiving, by a wireless network management entity, a consulting message for D2D communication between terminals that is sent directly or forwarded by an access point, where the consulting message is used to request the wireless network management entity to calculate a performance evaluation parameter for D2D communication between the terminals, where the performance evaluation parameter for D2D communication between the terminals is used to evaluate feasibility of measurement for D2D communication between the terminals; calculating, according to received device information of the terminals, the performance evaluation parameter for D2D communication between the terminals, where the device information includes capability information and location information of the terminals; and sending, to the access point, the performance evaluation parameter for D2D communication between the terminals.

In a first possible implementation manner, the performance evaluation parameter for D2D communication between the terminals includes: configuration information related to D2D communication, a propagation model of D2D communication, ambient noise, receive powers of the terminals in a D2D communication state, interference powers received by the terminals, and signal-to-noise ratios of the terminals in a D2D communication state; and the capability information of the terminals includes supported radio access technologies, supported frequency ranges, and maximum transmit powers of the terminals; and the calculating, according to device information of the terminals, the performance evaluation parameter for D2D communication between the terminals includes: determining, according to the capability information of the terminals, the configuration information related to D2D communication, where the configuration information includes radio access technologies, frequency ranges, and transmit powers that are used by the terminals; determining, according to the location information of the terminals, prestored information about wireless communication environments around the terminals, and the configuration information, the propagation model of D2D communication between the terminals, where the information about wireless communication environments around the terminals includes information about buildings, vegetation, co-channel interference sources, adjacent-channel interference sources, and ambient noise around the terminals; and obtaining, by calculation, the receive powers of the terminals in a D2D communication state according to the propagation model of D2D communication between the terminals and the transmit powers used by the terminals.

With reference to the second aspect or the first possible implementation manner of the second aspect, in a second possible implementation manner, if a terminal supports multiple radio access technologies and multiple frequency ranges at the same time, after the obtaining, by calculation, the receive powers of the terminals in a D2D communication state according to the propagation model of D2D communication between the terminals and the transmit powers used by the terminals, the method includes: separately determining a propagation model between the co-channel interference sources and the terminals and a propagation model between the adjacent-channel interference sources and the terminals according to the location information of the terminals, the information about wireless communication environments around the terminals, and the configuration information; obtaining, by calculation according to the propagation model between the co-channel interference sources and the terminals, the propagation model between the adjacent-channel interference sources and the terminals, transmit powers of the co-channel interference sources, and transmit powers of the adjacent-channel interference sources, the interference powers received by the terminals; and obtaining, by calculation, the signal-to-noise ratios of the terminals in a D2D communication state according to the receive powers, interference powers, and ambient noise of the terminals.

With reference to the second possible implementation manner of the second aspect, in a third possible implementation manner, before the receiving a consulting message for D2D communication between terminals that is sent directly or forwarded by an access point, the method includes: receiving the device information of the terminals sent by the access point or the terminals, where the device information of the terminals includes the capability information and location information of the terminals, where the capability information of the terminals includes supported radio access technologies, supported frequency ranges, and maximum transmit powers of the terminals.

A third aspect provides an access point, including a sending unit, configured to send directly or forward, to a wireless network management entity, a consulting message for D2D communication between terminals, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals; a receiving unit, configured to receive a performance evaluation parameter for D2D communication between the terminals that is sent by the wireless network management entity; and a determining unit, configured to determine, according to the performance evaluation parameter for D2D communication between the terminals that is received by the receiving unit, to perform the measurement for D2D communication between the terminals, and perform measurement configuration for the terminals, where the determining unit is further configured to determine, according to a result of the measurement for D2D communication between the terminals, to perform D2D communication between the terminals.

In a first possible implementation manner, the access point further includes: a judging unit, configured to determine whether a value of the performance evaluation parameter for D2D communication between the terminals that is received by the receiving unit is greater than a preset threshold of the performance parameter; and the determining unit is configured to, if the judging unit determines that the value of the performance evaluation parameter for D2D communication between the terminals is greater than the preset threshold of the performance parameter, determine to perform the measurement for D2D communication between the terminals.

With reference to the third aspect or the first possible implementation manner of the third aspect, in a second possible implementation manner, the access point further includes: an acquiring unit, configured to acquire device information of an attached terminal, where the device information of the terminal includes capability information and location information of the terminal, where the capability information of the terminal includes a supported radio access technology, a supported frequency range, and a maximum transmit power of the terminal; and the sending unit is further configured to send the device information of the terminal acquired by the acquiring unit to the wireless network management entity.

With reference to the second possible implementation manner of the third aspect, in a third possible implementation manner, the receiving unit is further configured to periodically receive the device information reported by the attached terminal; and the acquiring unit is further configured to acquire, in a process that the attached terminal establishes, with another terminal, data communication that is based on the access point itself, the device information reported by the attached terminal.

A fourth aspect of the present invention provides a wireless network management entity, including an information receiving unit, configured to receive a consulting message for D2D communication between terminals that is sent directly or forwarded by an access point, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals; a calculating unit, configured to calculate, according to device information of the terminals received by the information receiving unit, the performance evaluation parameter for D2D communication between the terminals, where the device information includes capability information and location information of the terminals; and a parameter sending unit, configured to send, to the access point, the performance evaluation parameter for D2D communication between the terminals obtained by the calculating unit by calculation.

In a first possible implementation manner, the calculating unit is further configured to determine, according to the capability information of the terminals, configuration information related to D2D communication, where the configuration information includes radio access technologies, frequency ranges, and transmit powers that are used by the terminals; the calculating unit is further configured to determine, according to the location information of the terminals, prestored information about wireless communication environments around the terminals, and the configuration information, a propagation model of D2D communication between the terminals, where the information about wireless communication environments around the terminals includes information about buildings, vegetation, co-channel interference sources, adjacent-channel interference sources, and ambient noise around the terminals; and the calculating unit is further configured to obtain, by calculation, receive powers of the terminals in a D2D communication state according to the propagation model of D2D communication between the terminals and the transmit powers used by the terminals.

With reference to the fourth aspect or the first possible implementation manner of the fourth aspect, in a second possible implementation manner, the calculating unit is further configured to separately determine a propagation model between the co-channel interference sources and the terminals and a propagation model between the adjacent-channel interference sources and the terminals according to the location information of the terminals, the information about wireless communication environments around the terminals, and the configuration information; the calculating unit is further configured to obtain, by calculation according to the propagation model between the co-channel interference sources and the terminals, the propagation model between the adjacent-channel interference sources and the terminals, transmit powers of the co-channel interference sources, and transmit powers of the adjacent-channel interference sources, interference powers received by the terminals; and the calculating unit is further configured to obtain, by calculation, signal-to-noise ratios of the terminals in a D2D communication state according to the receive powers, interference powers, and ambient noise of the terminals.

With reference to the second possible implementation manner of the fourth aspect, in a third possible implementation manner, the information receiving unit is further configured to receive the device information of the terminals sent by the access point or the terminals, where the device information of the terminals includes the capability information and location information of the terminals, where the capability information of the terminals includes supported radio access technologies, supported frequency ranges, and maximum transmit powers of the terminals.

A fifth aspect of the present invention provides a system for measurement for D2D communication, including the foregoing access point and the foregoing wireless network management entity.

It may be learned from the foregoing technical solution that the embodiments of the present invention have the following advantages: an eNB sends, to a REM, a consulting message for D2D communication between UEs, to request the REM to calculate a performance evaluation parameter for D2D communication between the UEs; then the eNB determines, according to the performance evaluation parameter fed back by the REM, to execute measurement for D2D communication between the UEs. In this way, the performance evaluation parameter obtained by the REM by calculation is used to filter out an invalid D2D communication request that does not meet an expectation, instead of performing measurement for all requests for D2D communication between the UEs, so as to save time for D2D communication between the UEs and save bandwidth resources.

DESCRIPTION OF EMBODIMENTS

Figure 1:
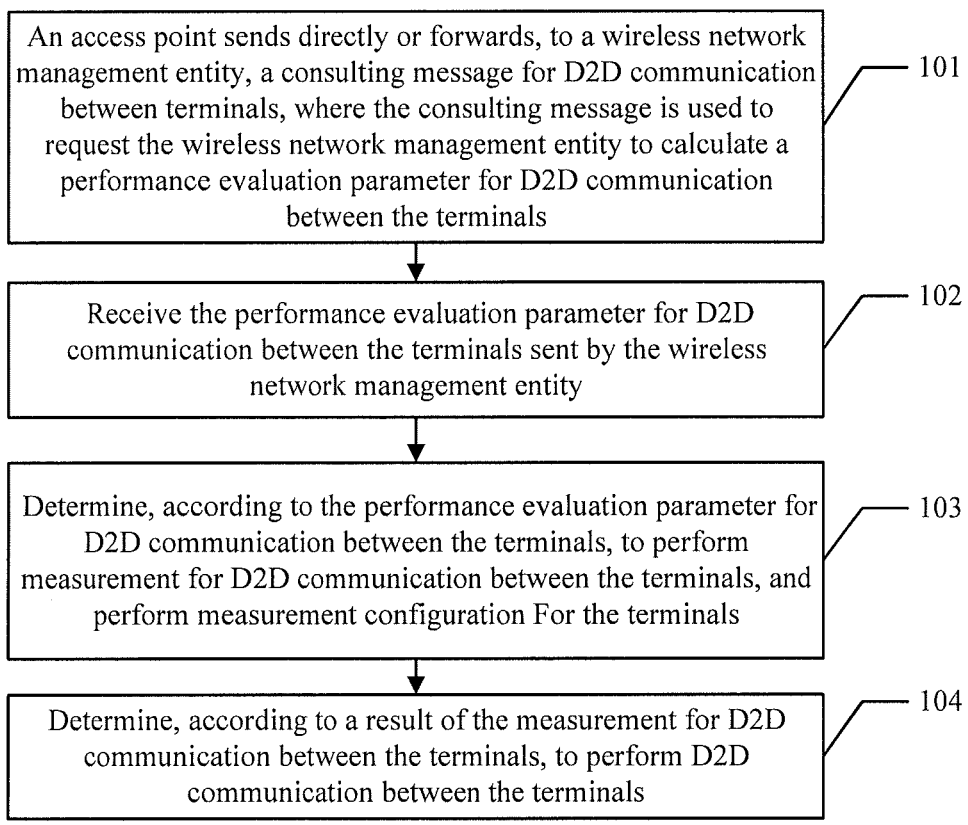
FIG. 1 is a schematic diagram of an embodiment of a method for measurement for D2D communication in embodiments of the present invention.

Embodiments of the present invention provide a method, apparatus, and system for measurement for D2D communication, used to reduce blindness of measurement in a mechanism of D2D communication between terminals and targeted at the repetition of measurement under different radio access technologies.

The following introduces in detail a method for measurement for D2D communication in the embodiments of the present invention. For ease of understanding, in the following embodiments, that an evolved NodeB (eNB, evolved Node B) is used as an access point is used as an example, and other base stations and access points that have a similar function all fall within the scope of the present invention; that a REM is used as a wireless network management entity is used as an example, and other databases that have a similar function, such as a wireless network management system and a wireless network spectrum management database, also fall within the scope of the present invention; and that two UEs are used to perform D2D communication between UEs is used as an example, and in the following embodiments, the method for measurement for D2D communication may be applied to a cellular network and may also be applied to a network of another type, for example, a WiFi (WiFi, Wireless-Fidelity) network, which is not specifically limited in the embodiments of the present invention.

A radio environment map (REM, Radio Environment MAP) is a real-time integrated database that describes a radio working environment, and in brief, is a digital abstraction of a radio working environment. The REM provides precise information support for a cognitive radio device or a cognitive radio network, thereby simplifying implementation of cognitive radio or a cognitive radio network. Information recorded by the REM includes geographic characteristics, available services and networks, spectrum management, location information, activated neighboring radio, user policy information, service provider information, and historical experience. A function of the REM to the cognitive radio may be analogous to a function of a map to traffic navigation. Most functions of the REM may be based on a cognitive engine, for example, scene awareness, inference, study, planning, and decision support. That the REM acquires the digital abstraction of a radio environment mainly relies on but is not limited to the following types of awareness:

1. Location Awareness:

A communications device needs to learn its own location, where a form of the location may be latitude, longitude, and altitude, or a location based on a local reference point.

2. Geographic Environment Awareness:

A communications device needs to learn information about buildings, streets, and terrain that is related to radio propagation and channel characteristics. This awareness is essential for the communications device to select an appropriate frequency spectrum, channel model, access technology, antenna configuration, and network technology.

3. Radio Frequency Environment and Waveform Awareness:

A communications device needs to learn frequency spectrum usage, an existence situation and distribution situation of cognitive users/authorized users, a user topology, an interference situation, and radio frequency characteristics concerned by the communications device.

4. Movement and Tracking Awareness:

A communications device needs to learn its own moving speed and direction. For example, with reference to geographic information, the communications device learns that the communications device itself is moving south along a main street at a speed of 45 miles per hour; then a radio environment may be foreseen, for example, an available channel or a radio interface standard that may be selected on a path when a user moves to a next hill.

With reference to FIG. 1, an embodiment of a method for measurement for D2D communication in the embodiments of the present invention includes:

101: An access point sends directly or forwards, to a wireless network management entity, a consulting message for D2D communication between terminals, where the consulting message is used to request the wireless network management entity to calculate a performance evaluation parameter for D2D communication between the terminals.

Either an eNB or a UE may trigger D2D communication between UEs, and a triggering reason may be that communication interference detected on a core network is strong, and may also be that load of the eNB or the UE itself is too high and needs to be distributed. A specific triggering reason is not limited. The UEs may be attached to a same eNB and may also be attached to different eNBs.

Specifically, if it is a UE that triggers D2D communication, one of the UEs sends the consulting message for D2D communication to the eNB, and the eNB forwards the consulting message to a REM, and if it is the eNB that triggers D2D communication between UEs, the eNB directly sends the consulting message for D2D communication to the REM, where the consulting message is used to request the REM to calculate the performance evaluation parameter for D2D communication between the UEs.

102: Receive a performance evaluation parameter for D2D communication between the terminals that is sent by the wireless network management entity.

The eNB receives the performance evaluation parameter that is for performing D2D communication between the UEs and is sent by the REM. The performance evaluation parameter is obtained by the REM by calculation and may be fed back by the REM in a manner of a consulting message.

103: Determine, according to the performance evaluation parameter for D2D communication between the terminals, to perform measurement for D2D communication between the terminals, and perform measurement configuration for the terminals.

It is determined, according to the performance evaluation parameter for D2D communication between the UEs, to perform the measurement for D2D communication between the UEs, and necessary measurement configuration is performed on the UEs, so as to complete the measurement for D2D communication between the UEs subsequently.

It should be noted that, this performance evaluation parameter is used to evaluate feasibility of the measurement for D2D communication between the terminals. If all performance evaluation parameters are inferior to corresponding performance parameters when the terminals and a network communication situation are in an ideal state, then it may be confirmed that, there is no need to continue to perform D2D communication because an actual situation definitely cannot achieve the performance parameters in the ideal state.

104: Determine, according to a result of the measurement for D2D communication between the terminals, to perform D2D communication between the terminals.

In this embodiment of the present invention: an eNB sends, to a REM, a consulting message for D2D communication between UEs, to request the REM to calculate a performance evaluation parameter for D2D communication between the UEs; then the eNB determines, according to the performance evaluation parameter fed back by the REM, to execute measurement for D2D communication between the UEs. In this way, the performance evaluation parameter obtained by the REM by calculation is used to filter out an invalid D2D communication request that does not meet an expectation, instead of performing measurement for all requests for D2D communication between the UEs, so as to save time for D2D communication between the UEs and save bandwidth resources.

Figure 2:
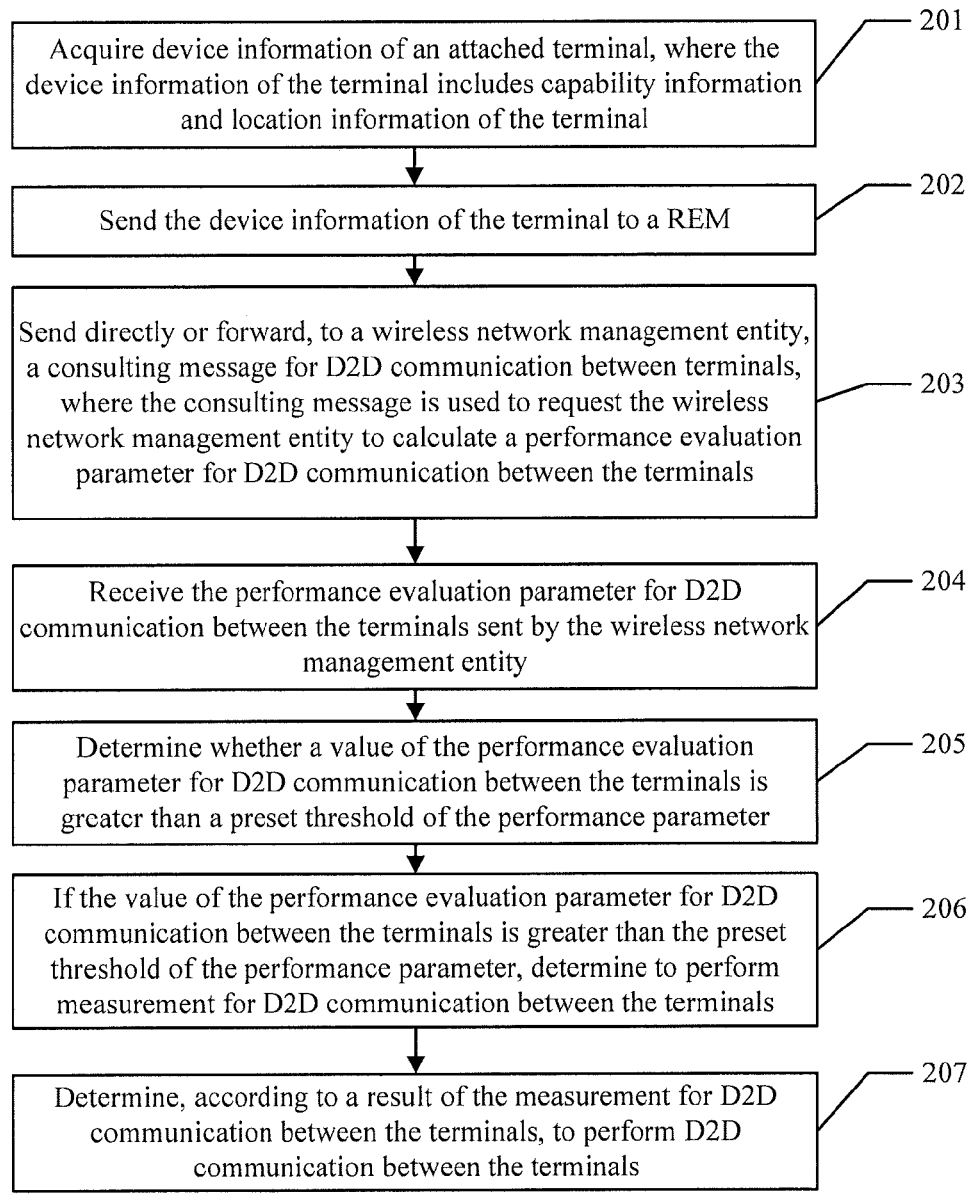
FIG. 2 is a schematic diagram of another embodiment of the method for measurement for D2D communication in the embodiments of the present invention.

For ease of understanding, with reference to FIG. 2, another embodiment of the method for measurement for D2D communication in the embodiments of the present invention includes:

201: Acquire device information of an attached terminal, where the device information of the terminal includes capability information and location information of the terminal.

An eNB acquires device information of a terminal that is attached to the eNB, where the device information of the terminal includes capability information and location information of the terminal, where the capability information of the terminal includes a supported radio access technology, a supported frequency range, and a maximum transmit power of the terminal.

A specific manner of acquiring, by the eNB, the device information of the terminal that is attached to the eNB may be that the eNB periodically receives the device information reported by the attached UE, and may also be that the eNB acquires the device information reported by the attached terminal in a process that the attached terminal establishes, with another terminal, data communication that is based on the eNB itself.

In this embodiment, two terminals may be attached to a same eNB, and may also be attached to different eNBs. For ease of description, when the terminals are attached to different eNBs, that the terminals are attached to two eNBs respectively is used as an example.

When two terminals are attached to a same eNB, a first UE registers with a REM after being attached to the eNB and a second UE registers with the REM after being attached to the eNB; and when two terminals are attached to different eNBs, a first UE registers with a REM after being attached to a first eNB, and a second UE registers with the REM after being attached to a second eNB. Registration information includes a device identifier of a UE.

It should be noted that, an eNB registers with a REM upon power-on and registration information includes: a radio access technology, a maximum transmit power, and location information of the eNB.

202: Send the device information of the terminal to a REM.

The eNB sends the device information of the terminal that is attached to the eNB to the REM, where the device information includes the capability information and location information of the attached terminal, where the capability information includes a supported radio access technology, a supported frequency range, and a maximum transmit power of the terminal.

It should be noted that, the terminal may also send the device information of the terminal itself to the REM. There are multiple sending manners, for example, carrying the device information by using a paging message, or reporting the device information in a process where, the terminal establishes, with another terminal, data communication that is based on the access point itself.

Because the location information of the UE changes continuously, the eNB or the UE may also send, at a preset interval, latest location information of the UE to the REM for information update.

203: Send directly or forward, to a wireless network management entity, a consulting message for D2D communication between terminals, where the consulting message is used to request the wireless network management entity to calculate a performance evaluation parameter for D2D communication between the terminals.

Either the eNB or a UE may trigger D2D communication between UEs, and a triggering reason may be that communication interference detected on a core network is strong, and may also be that load of the eNB or the UE itself is too high and needs to be distributed. A specific triggering reason is not limited.

Specifically, if it is a UE that triggers D2D communication, one of the UEs sends the consulting message for D2D communication to the eNB, and the eNB forwards the consulting message to the REM, and if it is the eNB that triggers D2D communication between the UEs, the eNB directly sends the consulting message for D2D communication to the REM, where the consulting message is used to request the REM to calculate the performance evaluation parameter for D2D communication between the UEs.

204: Receive a performance evaluation parameter for D2D communication between the terminals that is sent by the wireless network management entity.

The eNB receives the performance evaluation parameter that is for performing D2D communication between the UEs and is sent by the REM. The performance evaluation parameter is obtained by the REM by calculation and may be fed back by the REM in a manner of a consulting message. The performance evaluation parameter may specifically include: configuration information related to D2D communication, a propagation model of D2D communication, ambient noise, receive powers of the terminals in a D2D communication state, interference powers received by the terminals, and signal-to-noise ratios of the terminals in a D2D communication state, where the configuration information related to D2D communication includes radio access technologies, frequency ranges, and transmit powers that are used by the terminals. The performance evaluation parameter may further include a propagation model between a co-channel interference source and the terminals and a propagation model between an adjacent-channel interference source and the terminals.

It should be noted that this performance evaluation parameter is used to evaluate feasibility of measurement for D2D communication between the terminals. If all performance evaluation parameters are inferior corresponding performance parameters where the terminals and a network communication situation are in an ideal state, then it may be confirmed that, there is no need to continue to perform D2D communication because an actual situation definitely cannot achieve the performance parameters in the ideal state.

205: Determine whether a value of the performance evaluation parameter for D2D communication between the terminals is greater than a preset threshold of the performance parameter.

The determining whether a value of the performance evaluation parameter for D2D communication between the terminals is greater than a preset threshold of the performance parameter is mainly to compare the receive powers of the terminals in a D2D communication state and the signal-to-noise ratios of the terminals in a D2D communication state. A signal-to-interference ratio of a terminal in a D2D communication state and a signal-to-noise plus interference power ratio of a terminal in a D2D communication state may also be compared.

If the value of the performance evaluation parameter for D2D communication between the terminals is greater than the preset threshold of the performance parameter, perform the measurement for D2D communication; if the value of the performance evaluation parameter for D2D communication between the terminals is not greater than the preset threshold of the performance parameter, the measurement for D2D communication is not perform so as to avoid wasting measure time and bandwidth.

206: If the value of the performance evaluation parameter for D2D communication between the terminals is greater than the preset threshold of the performance parameter, determine to perform measurement for D2D communication between the terminals.

If the value of the performance evaluation parameter for D2D communication between the terminals is greater than the preset threshold of the performance parameter, it indicates that performance of D2D communication between the terminals is good, and the measurement for D2D communication between the terminals can be performed.

207: Determine, according to a result of the measurement for D2D communication between the terminals, to perform D2D communication between the terminals.

A specific manner may be that, the result that is of the measurement for D2D communication and is reported by the terminals is received, and the result of the measurement for D2D communication between the terminals is compared with a preset threshold of the result of the measurement; and if the result of the measurement for D2D communication between the terminals is greater than the preset threshold of the result of the measurement, it is determined to perform D2D communication between the terminals; otherwise, it is determined not to perform D2D communication between the terminals.

In this embodiment of the present invention, an eNB makes a consulting request, to a REM, for a D2D communication connection; the REM obtains feedback information by calculation, where the feedback information includes performance evaluation parameters for D2D communication, and determines whether values of the performance evaluation parameters for D2D communication between terminals are greater than preset thresholds of the performance parameters, where if the values of the performance evaluation parameters for D2D communication between terminals are greater than the preset thresholds of the performance parameters, measurement for D2D communication is performed, and if the values of the performance evaluation parameters for D2D communication between terminals is not greater than the preset thresholds of the performance parameters, the measurement for D2D communication is not performed. The feedback information obtained by the REM by calculation may be used to filter out an invalid D2D communication request that does not meet an expectation, instead of performing measurement for all requests for D2D communication, so as to save time and bandwidth resources. In addition, this method is applicable to a scenario in which UEs are attached to different base stations.

The foregoing describes, from a base station side, the method for measurement for D2D communication in the embodiments of the present invention. The following describes the method for measurement for D2D communication in the embodiments of the present invention from a REM side.

Figure 3:
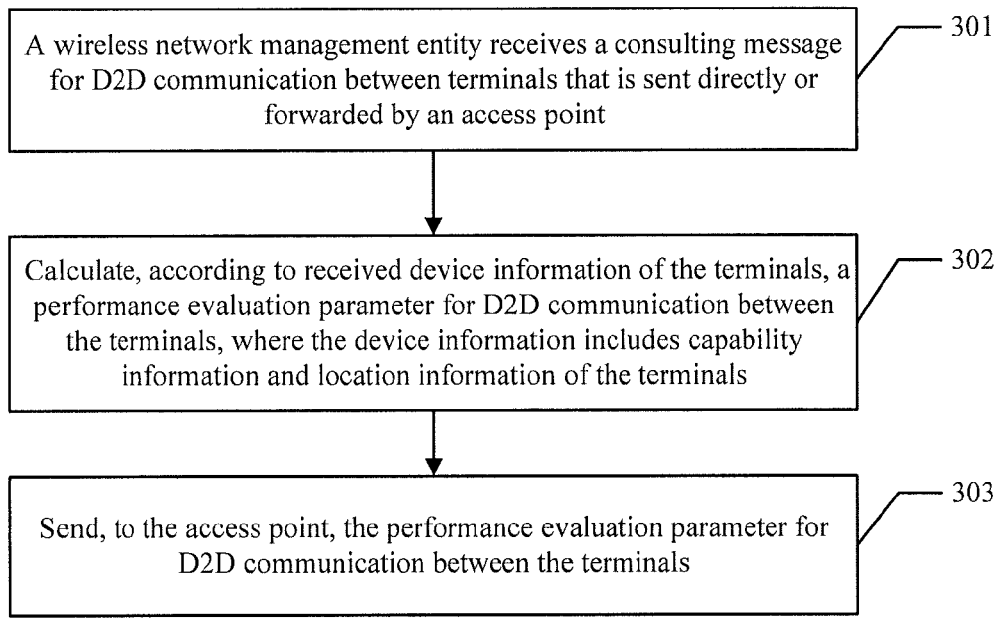
FIG. 3 is a schematic diagram of still another embodiment of the method for measurement for D2D communication in the embodiments of the present invention.

With reference to FIG. 3, still another embodiment of the method for measurement for D2D communication in the embodiments of the present invention includes:

301: A wireless network management entity receives a consulting message for D2D communication between terminals that is sent directly or forwarded by an access point.

The consulting message is used to request the wireless network management entity to calculate a performance evaluation parameter for D2D communication between the terminals, where the performance evaluation parameter is used to evaluate feasibility of measurement for D2D communication between the terminals.

In this embodiment, a REM receives a consulting message for D2D communication between terminals that is sent directly or forwarded by an eNB, where the consulting message is used to request the REM to calculate a performance evaluation parameter for D2D communication between UEs. That the UEs are attached to an eNB may be that the UEs are attached to a same eNB and may also be that the UEs are attached to different eNBs.

302: Calculate, according to received device information of the terminals, the performance evaluation parameter for D2D communication between the terminals, where the device information includes capability information and location information of the terminals.

The capability information of the terminals includes supported radio access technologies, supported frequency ranges, and maximum transmit powers of the terminals.

The device information of the terminals maybe sent by the terminals and may also be forwarded by the eNB.

303: Send, to the access point, the performance evaluation parameter for D2D communication between the terminals.

This performance evaluation parameter is used to evaluate feasibility of measurement for D2D communication between the terminals. If all performance evaluation parameters are inferior to corresponding performance parameters when the terminals and a network communication situation are in an ideal state, then it may be confirmed that, there is no need to continue to perform D2D communication because an actual situation definitely cannot achieve the performance parameters in the ideal state.

In this embodiment of the present invention, after receiving a consulting message for D2D communication, a wireless network management entity calculates, according to received device information of terminals, a performance evaluation parameter of a connection request for D2D communication between the terminals, which provides determining basis for determining, by an access point, whether to perform measurement; and sends a calculation result to the access point. The wireless network management entity performs calculation in view of a radio access technology of a UE, which avoids separate calculation, by the UE, of time consumption and electricity consumption under every radio access technology.

Figure 4:
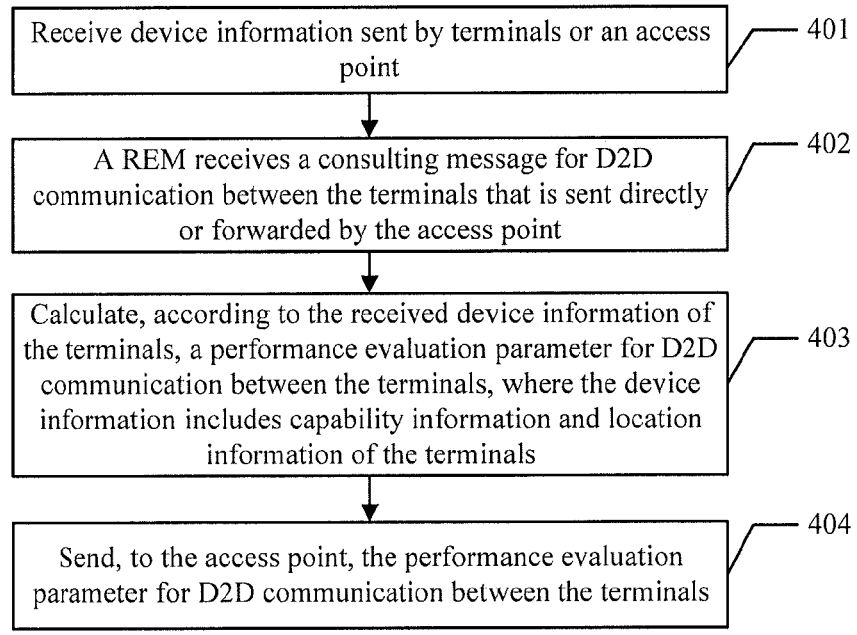
FIG. 4 is a schematic diagram of yet another embodiment of the method for measurement for D2D communication in the embodiments of the present invention.

The following uses another embodiment to describe in detail a method for measurement for D2D communication according to an embodiment of the present invention. With reference to FIG. 4, yet another embodiment of the method for the measurement for D2D communication in the embodiments of the present invention includes:

401: Receive device information sent by a terminal or an access point.

The device information sent by the terminal or the access point is received, where the device information includes capability information and location information of the terminal, where the capability information of the terminal includes a supported radio access technology, a supported frequency range, and a maximum transmit power of the terminal.

Specifically, when two terminals are attached to a same eNB, a first UE registers with a REM after being attached to the eNB and a second UE registers with the REM after being attached to the eNB; and when two terminals are attached to different eNBs, a first UE registers with a REM after being attached to a first eNB, and a second UE registers with the REM after being attached to a second eNB. Registration information includes a device identifier of a UE.

It should be noted that, an eNB registers with a REM upon power-on and registration information includes: a radio access technology, a maximum transmit power, and location information of the eNB.

Further, There are multiple manners for sending the device information of the terminal, for example, carrying the device information by using a paging message, or reporting the device information in a process of establishing, by the terminal and another terminal, data communication that is based on the access point itself. Because the location information of the UE changes continuously, the eNB or the UE may also send, at a preset interval, latest location information of the UE to the REM for information update.

402: A REM receives a consulting message for D2D communication between terminals that is sent directly or forwarded by the access point.

The consulting message is used to request the wireless network management entity to calculate a performance evaluation parameter for D2D communication between the terminals, where the performance evaluation parameter is used to evaluate feasibility of measurement for D2D communication between the terminals.

403: Calculate, according to received device information of the terminal, the performance evaluation parameter for D2D communication between the terminals, where the device information includes capability information and location information of the terminals.

The performance evaluation parameter for D2D communication between terminals is calculated according to the received device information of the terminal forwarded by the access point or sent by the terminal, where the device information includes the capability information and location information of the terminal, where the capability information of the terminal includes a supported radio access technology, a supported frequency range, and a maximum transmit power of the terminal.

Specifically, configuration information related to D2D communication is determined according to the capability information of the terminals, where the configuration information includes radio access technologies, frequency ranges, and transmit powers that are used by the terminals.

A propagation model of D2D communication between the terminals is determined according to the received location information of the terminals, prestored information about wireless communication environments around the terminals, and the configuration information related to D2D communication. The propagation model is used to describe a path loss and a relationship of a straight-line distance between a central frequency channel number and a communication point. The information about wireless communication environments around the terminals includes information about buildings, vegetation, co-channel interference sources, adjacent-channel interference sources, and ambient noise around the terminal.

The receive powers of the terminals in a D2D communication state are obtained by calculation according to the propagation model of D2D communication between the terminals and the transmit powers used by the terminal.

Further, if the first UE and the second UE can support multiple radio access technologies and multiple frequency ranges at the same time, the REM may further repeat the foregoing steps to obtain new configuration information of D2D communication and obtain receive power of the first UE and the second UE by calculation, and the REM may further maintain a use situation of a channel on a radio air interface side. In this way, the REM can further consider power of interference of the periphery to the first UE and the second UE, so as to obtain, by calculation, a corresponding receive signal-to-noise ratio.

Specifically, a propagation model between the co-channel interference sources and the terminals and a propagation model between the adjacent-channel interference sources and the terminals are determined according to the location information of the terminal, the information about the wireless communication environment at the periphery of the terminal, and the configuration information related to D2D communication.

Power of interference endured by the terminal is obtained by calculation according to the propagation model between the co-channel interference sources and the terminals, the propagation model between the adjacent-channel interference sources and the terminals, transmit powers of the co-channel interference sources, and transmit powers of the adjacent-channel interference sources.

The signal-to-noise ratio of the terminal in a D2D communication state is obtained by calculation according to the receive power, the power of the interference, the ambient noise that are of the terminal.

The foregoing calculation process is the prior art, which is not described herein again.

404: Send, to the access point, the performance evaluation parameter for D2D communication between the terminals.

This performance evaluation parameter is used to evaluate the feasibility of the measurement for D2D communication between the terminals. If all performance evaluation parameters are inferior to corresponding performance parameters when the terminals and a network communication situation are in an ideal state, then it may be confirmed that, there is no need to continue to perform D2D communication because an actual situation definitely cannot achieve the performance parameters in the ideal state.

In this embodiment of the present invention, according to received device information and location information of a terminal, a REM obtains by calculation, configuration information related to D2D communication between terminals; feeds back receive power and a receive signal-to-noise ratio that are of a first UE and a second UE and are obtained by calculation to a base station, which provides determining basis for determining, by the base station, whether to perform measurement; and sends a calculation result to the base station. The REM performs calculation in view of the radio access technologies of the UEs, which avoids separate calculation, by the UEs, of time consumption and electricity consumption under every radio access technology.

For ease of understanding, the following describes a process of communication among an access point, a wireless network management entity, and a terminal in the embodiments of the present invention. For ease of description, in the following process of communication, that an eNB is used as an access point, that a REM is used as a wireless network management entity, and a scenario in which two UEs are used as terminals are used as an example.

Figure 5:
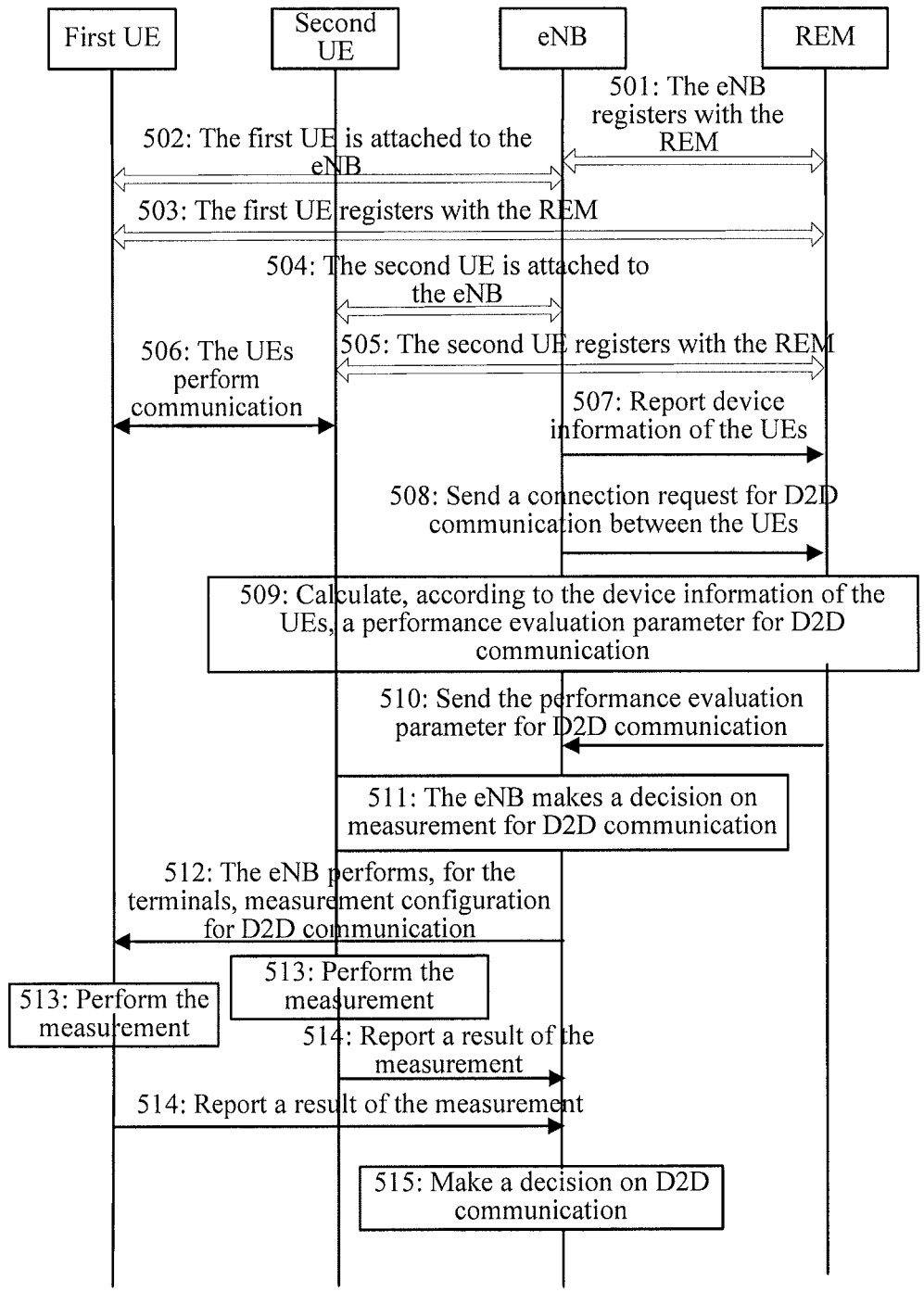
FIG. 5 is a flowchart of access-point-triggered measurement for D2D communication between terminals when the terminals are attached to a same access point, according to an embodiment of the present invention.

With reference to FIG. 5, when two UEs are attached to a same eNB, a process of eNB-triggered measurement for D2D communication between the terminals is as follows:

501: The eNB registers with a REM.
502: A first UE is attached to the eNB.
503: The first UE registers with the REM.
504: A second UE is attached to the eNB.
505: The second UE registers with the REM.
506: The UEs perform communication based on the eNB.
507: The eNB reports device information of the UEs.

The eNB acquires the device information of the UEs and reports the device information to the REM.

508: The eNB sends, to the REM, a connection request for D2D communication between the UEs.

The eNB triggers measurement for D2D communication, and sends, to the REM, the connection request for D2D communication between the UEs.

509: The REM calculates, according to the device information of the UEs, a performance evaluation parameter for D2D communication.

510: The REM sends the calculated performance evaluation parameter for D2D communication to the eNB.

511: The eNB makes a decision on the measurement for D2D communication between the terminals.

The eNB determines, according to the performance evaluation parameter for D2D communication that is sent by the REM, whether to perform the measurement for D2D communication between the terminals.

512: The eNB performs, for the terminals, measurement configuration for D2D communication.

When it is determined to perform the measurement for D2D communication between the terminals, the eNB performs, for the terminals, the measurement configuration for D2D communication.

513: Perform, for the terminals, the measurement for D2D communication.

514: The terminals report, to the eNB, a result of the measurement for D2D communication.

515: The eNB makes, according to the result of the measurement, a decision on D2D communication between the terminals.

The eNB makes, according to the result of the measurement, a decision on D2D communication between the terminals, and determines whether to perform D2D communication between the terminals.

Figure 6:
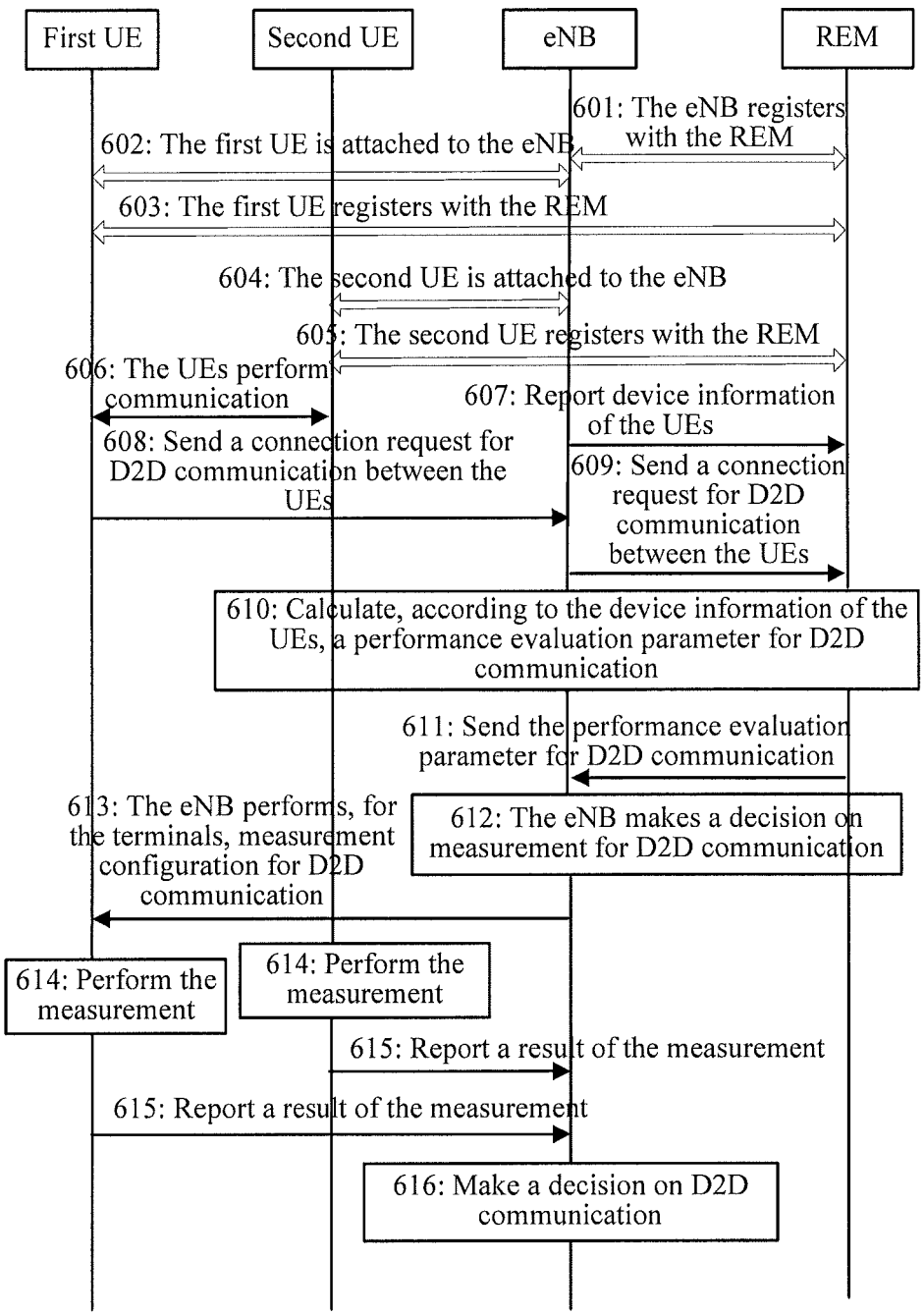
FIG. 6 is a flowchart of terminal-triggered measurement for D2D communication between terminals when the terminals are attached to a same access point, according to an embodiment of the present invention.

With reference to FIG. 6, when two UEs are attached to a same eNB, a process of terminal-triggered measurement for D2D communication is as follows:

601: The eNB registers with a REM.
602: A first UE is attached to the eNB.
603: The first UE registers with the REM.
604: A second UE is attached to the eNB.
605: The second UE registers with the REM.
606: The UEs perform communication based on the eNB.
607: The eNB reports device information of the UEs.

The eNB acquires the device information of the UEs and reports the device information to the REM.

608: A UE sends, to the eNB, a connection request for D2D communication between the UEs.

The UE triggers measurement for D2D communication, and sends, to the REM, the connection request for D2D communication between the UEs.

609: The eNB sends, to the REM, the connection request for D2D communication between the UEs.

The eNB forwards, to the REM, the connection request for D2D communication between the UEs.

610: The REM calculates, according to the device information of the UEs, a performance evaluation parameter for D2D communication.

611: The REM sends the calculated performance evaluation parameter for D2D communication to the eNB.

612: The eNB makes a decision on the measurement for D2D communication between the terminals.

The eNB determines, according to the performance evaluation parameter for D2D communication that is sent by the REM, whether to perform the measurement for D2D communication between the terminals.

613: The eNB performs, for the terminals, measurement configuration for D2D communication.

When it is determined to perform the measurement for D2D communication between the terminals, the eNB performs, for the terminals, the measurement configuration for D2D communication.

614: Perform, for the terminals, the measurement for D2D communication.

615: The terminals report, to the eNB, a result of the measurement for D2D communication.

616: The eNB makes, according to the result of the measurement, a decision on D2D communication between the terminals.

The eNB makes, according to the result of the measurement, a decision on D2D communication between the terminals, and determines whether to perform D2D communication between the terminals.

Figure 7:
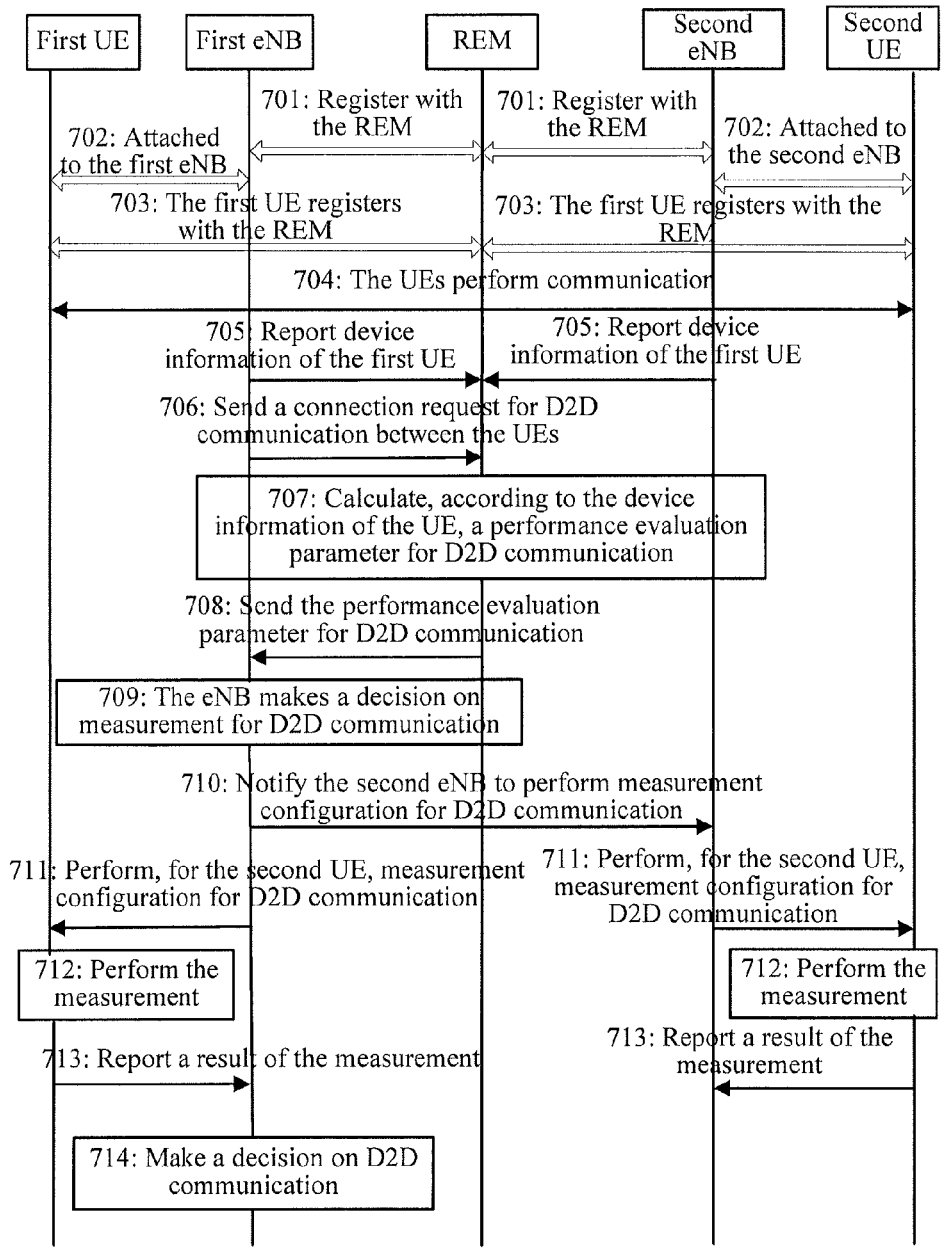
FIG. 7 is a flowchart of access-point-triggered measurement for D2D communication between terminals when the terminals are attached to different access points, according to an embodiment of the present invention.

With reference to FIG. 7, when two UEs are attached to different eNBs, a process of eNB-triggered measurement for D2D communication is as follows:

701: A first eNB and a second eNB separately register with a REM.

702: Different UEs are attached to different eNBs.

A first UE is attached to the first eNB and a second UE is attached to the second eNB.

703: The UEs register with the REM.

Both the first UE and the second UE register with the REM.

704: The first UE and the second UE perform communication based on the first eNB and the second eNB.

705: The eNBs report device information of the UEs.

The first eNB acquires the device information of the first UE and reports the device information to the REM; and the second eNB acquires the device information of the second UE and reports the device information to the REM.

706: The first eNB sends, to the REM, a connection request for D2D communication between the UEs.

The first eNB triggers measurement for D2D communication, and sends, to the REM, the connection request for D2D communication between the UEs. The second eNB may also trigger the measurement for D2D communication with a same communication process.

707: The REM calculates, according to the device information of the UEs, a performance evaluation parameter for D2D communication.

708: The REM sends the calculated performance evaluation parameter for D2D communication to the first eNB.

709: The first eNB makes a decision on the measurement for D2D communication between the terminals.

The first eNB determines, according to the performance evaluation parameter for D2D communication that is sent by the REM, whether to perform the measurement for D2D communication between the terminals.

710: The first eNB notifies the second eNB to perform measurement configuration for D2D communication.

When it is determined to perform the measurement for D2D communication between the terminals, the first eNB notifies the second eNB to perform the measurement configuration for D2D communication.

711: The eNBs perform, for the terminals, the measurement configuration for D2D communication.

The first eNB performs, for the first UE, the measurement configuration for D2D communication, and the second eNB performs, for the second UE, the measurement configuration for D2D communication.

712: Perform, for the first terminal and the second terminal, the measurement for D2D communication.

713: The terminals report, to the eNBs to which the terminals are respectively attached, a result of the measurement for D2D communication.

The first UE and the second terminal report, to the first eNB and the second terminal respectively, the result of the measurement for D2D communication.

714: The eNB makes, according to the result of the measurement, a decision on D2D communication between the terminals.

The eNB makes, according to the result of the measurement, a decision on D2D communication between the terminals, and determines whether to perform D2D communication between the terminals.

Figure 8:
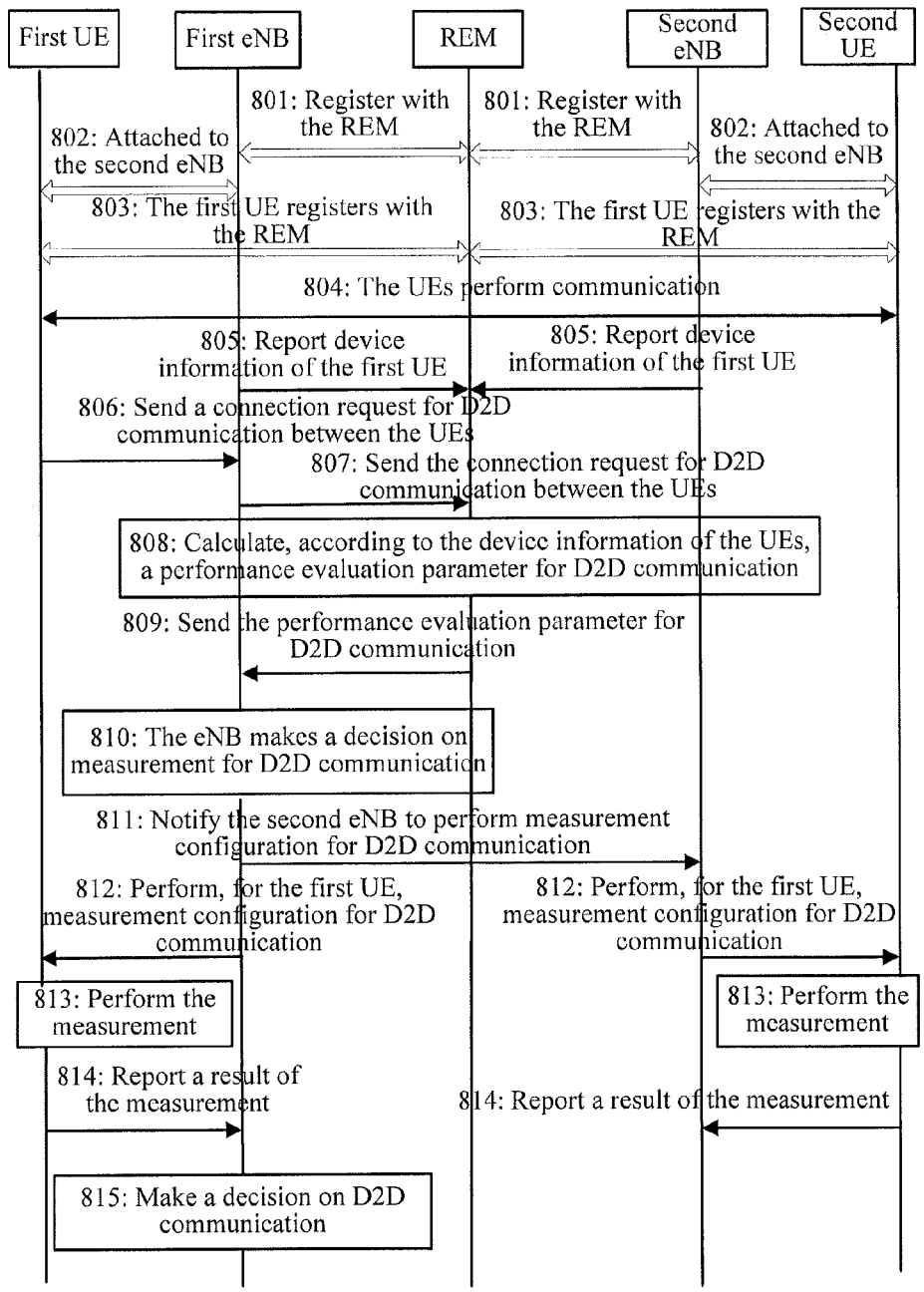
FIG. 8 is a flowchart of terminal-triggered measurement for D2D communication between terminals when the terminals are attached to different access points, according to an embodiment of the present invention.

With reference to FIG. 8, when two UEs are attached to different eNBs, a process of terminal-triggered measurement for D2D communication is as follows:

801: A first eNB and a second eNB register with a REM.

802: Different UEs are attached to different eNBs.

A first UE is attached to the first eNB and a second UE is attached to the second eNB.

803: The UEs register with the REM.

Both the first UE and the second UE register with the REM.

804: The first UE and the second UE perform communication based on the first eNB and the second eNB.

805: The eNBs report device information of the UEs.

The first eNB acquires the device information of the first UE and reports the device information to the REM; and the second eNB acquires the device information of the second UE and reports the device information to the REM.

806: The first UE sends, to the first eNB, a connection request for D2D communication between the UEs.

The first UE triggers measurement for D2D communication, and sends, to the first eNB, the connection request for D2D communication between the UEs. The second UE may also trigger the measurement for D2D communication with a same communication process.

807: The first eNB sends, to the REM, the connection request for D2D communication between the UEs.

The first eNB forwards, to the REM, the connection request for D2D communication between the UEs.

808: The REM calculates, according to the device information of the UEs, a performance evaluation parameter for D2D communication.

809: The REM sends the calculated performance evaluation parameter for D2D communication to the first eNB.

810: The first eNB makes a decision on measurement for D2D communication between the terminals.

The first eNB determines, according to the performance evaluation parameter for D2D communication that is sent by the REM, whether to perform the measurement for D2D communication between the terminals.

811: The first eNB notifies the second eNB to perform measurement configuration for D2D communication.

When it is determined to perform the measurement for D2D communication between the terminals, the first eNB notifies the second eNB to perform the measurement configuration for D2D communication.

812: The eNBs perform, for the terminals, the measurement configuration for D2D communication.

The first eNB performs, for the first UE, the measurement configuration for D2D communication, and the second eNB performs, for the second UE, the measurement configuration for D2D communication.

813: Perform, for the first terminal and the second terminal, the measurement for D2D communication.

814: The terminals report, to the eNBs to which the terminals are respectively attached, a result of the measurement for D2D communication.

The first UE and the second terminal report, to the first eNB and the second terminal respectively, the result of the measurement for D2D communication.

815: The eNB makes, according to the result of the measurement, a decision on D2D communication between the terminals.

The eNB makes, according to the result of the measurement, a decision on D2D communication between the terminals, and determines whether to perform D2D communication between the terminals.

Figure 9:
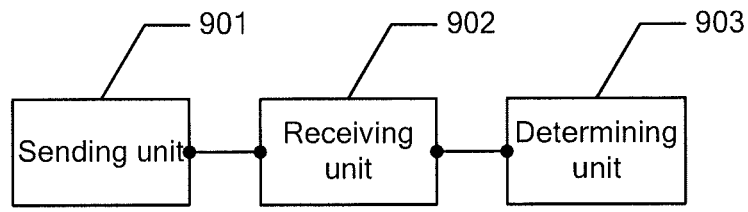
FIG. 9 is a schematic diagram of an embodiment of an access point in the embodiments of the present invention.

The following introduces the apparatus part of the embodiments of the present invention. With reference to FIG. 9, an access point in an embodiment of the present invention includes:

a sending unit 901, configured to send directly or forward, to a wireless network management entity, a consulting message for D2D communication between terminals, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals;

a receiving unit 902, configured to receive a performance evaluation parameter for D2D communication between the terminals that is sent by the wireless network management entity; and a determining unit 903, configured to determine, according to the performance evaluation parameter for D2D communication between the terminals that is received by the receiving unit, to perform the measurement for D2D communication between the terminals, and perform measurement configuration for the terminals, where the determining unit 903 is further configured to determine, according to a result of the measurement for D2D communication between the terminals, to perform D2D communication between the terminals.

In this embodiment, the performance evaluation parameter for D2D communication between the terminals includes: configuration information related to D2D communication, a propagation model of D2D communication, ambient noise, receive powers of the terminals in a D2D communication state, interference powers received by the terminals, and signal-to-noise ratios of the terminals in a D2D communication state.

For a process of implementing a respective function of each unit of the access point in this embodiment of the present invention, reference may be made to the specific description in the foregoing embodiment shown in the FIG. 1, which is not described herein again.

In this embodiment of the present invention, a sending unit 901 sends directly or forwards, to a wireless network management entity, a consulting message for D2D communication between terminals; a receiving unit 902 receives a performance evaluation parameter for D2D communication between the terminals that is sent by the wireless network management entity, where the performance evaluation parameter for D2D communication between the terminals is used to evaluate feasibility of measurement for D2D communication between the terminals; a determining unit 903 determines, according to a result of the measurement for D2D communication between the terminals, to perform D2D communication between the terminals. In this way, the performance evaluation parameter obtained by the wireless network management entity by calculation is used to filter out an invalid request for D2D communication between the terminals that does not meet an expectation, instead of performing measurement for all requests for D2D communication between the terminals, so as to save time for D2D communication between the terminals and save bandwidth resources.

Figure 10:
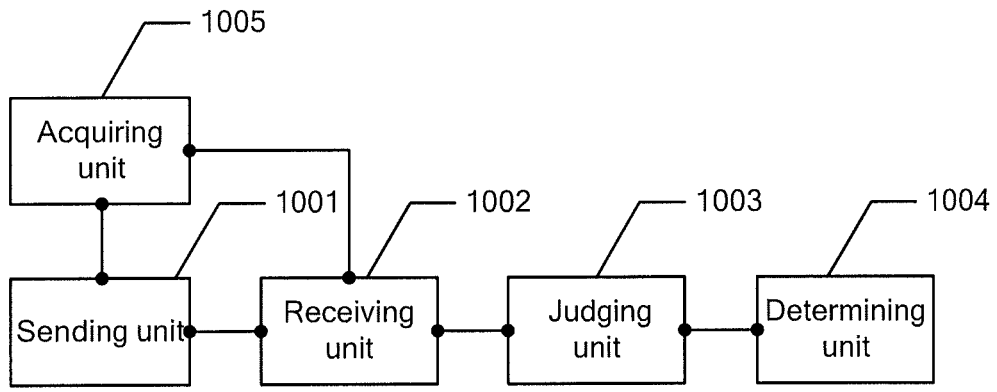
FIG. 10 is a schematic diagram of another embodiment of the access point in the embodiments of the present invention.

For ease of understanding, the following introduce an access point according to an embodiment of the present invention in detail. With reference to FIG. 10, another embodiment of the access point in the embodiments of the present invention includes:

a sending unit 1001, configured to send directly or forward, to a wireless network management entity, a consulting message for D2D communication between terminals;

a receiving unit 1002, configured to receive a performance evaluation parameter for D2D communication between the terminals that is sent by the wireless network management entity, where the performance evaluation parameter for D2D communication between the terminals is used to evaluate feasibility of measurement for D2D communication between the terminals;

a judging unit 1003, configured to determine whether a value of the performance evaluation parameter for D2D communication between the terminals that is received by the receiving unit 1002 is greater than a preset threshold of the performance parameter; and a determining unit 1004, configured to, if the judging unit 1003 determines that the value of the performance evaluation parameter for D2D communication between the terminals is greater than the preset threshold of the performance parameter, determine to perform the measurement for D2D communication between the terminals.

The determining unit 1004 is further configured to determine, according to a result of the measurement for D2D communication between the terminals, to perform D2D communication between the terminals.

In this embodiment, the performance evaluation parameter for D2D communication between the terminals includes: configuration information related to D2D communication, a propagation model of D2D communication, ambient noise, receive powers of the terminals in a D2D communication state, interference powers received by the terminals, and signal-to-noise ratios of the terminals in a D2D communication state.

It should be noted that, the access point in this embodiment of the present invention may further include:

an acquiring unit 1005, further configured to acquire device information of an attached terminal, where the device information of the terminal includes capability information and location information of the terminal, where the capability information of the terminal includes a supported radio access technology, a supported frequency range, and a maximum transmit power of the terminal.

The sending unit 1001 is further configured to send the device information of the terminal acquired by the acquiring unit 1005 to the wireless network management entity.

Further, the receiving unit 1002 is further configured to periodically receive the device information reported by the attached terminal.

The acquiring unit 1005 is further configured to acquire, in a process that the attached terminal establishes, with another terminal, data communication that is based on the access point itself, the device information reported by the attached terminal.

For a process of implementing a respective function of each unit of the access point in this embodiment of the present invention, reference may be made to the specific description in the foregoing embodiment shown in the FIG. 2, which is not described herein again.

In this embodiment of the present invention, that an acquiring unit 1005 acquires device information of an attached terminal may specifically be as follows: a receiving unit 1002 periodically receives the device information reported by the attached terminal, or the acquiring unit 1005 acquires, in a process that the attached terminal establishes, with another terminal, data communication that is based on an access point itself, the device information reported by the attached terminal; then, a sending unit 1001 sends, to a wireless network management entity, the device information of the terminal acquired by the acquiring unit 1005; the sending unit 1001 sends directly or forwards, to the wireless network management entity, a consulting message for D2D communication between terminals; a receiving unit 1002 receives a performance evaluation parameter for D2D communication between the terminals that is sent by the wireless network management entity; a judging unit 1003 determines whether a value of the performance evaluation parameter for D2D communication between the terminals that is received by the receiving unit 1002 is greater than a preset threshold of the performance parameter; and if the judging unit 1003 determines that the value of the performance evaluation parameter for D2D communication between the terminals is greater than the preset threshold of the performance parameter, a determining unit 1004 determines to perform measurement for D2D communication between the terminals, and the determining unit 1004 determines, according to a result of the measurement for D2D communication between the terminals, to perform D2D communication between the terminals. In this way, an access point makes a consulting request, to a wireless network management entity, for a D2D communication connection. The wireless network management entity obtains feedback information by calculation, which includes performance evaluation parameters for D2D communication between terminals; determines whether values of the performance evaluation parameters for D2D communication between the terminals are greater than preset thresholds of the performance parameters. If the values of the performance evaluation parameters for D2D communication between the terminals are greater than the preset thresholds of the performance parameters, measurement for D2D communication between the terminals is performed, and if the values of the performance evaluation parameters for D2D communication between the terminals are not greater than the preset thresholds of the performance parameters, the measurement for D2D communication between the terminals is not performed. The feedback information obtained by the wireless network management entity by calculation may be used to filter out an invalid request for D2D communication between the terminals that does not meet an expectation, instead of performing measurement for all requests for D2D communication between the terminals, so as to save time and bandwidth resources.

Figure 11:
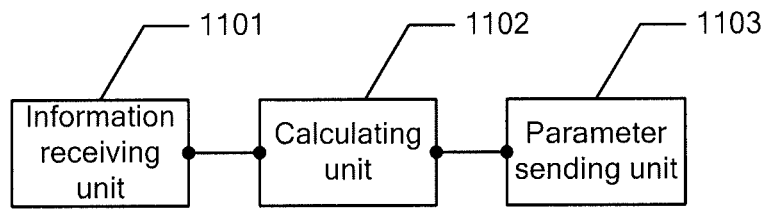
FIG. 11 is a schematic diagram of an embodiment of a wireless network management entity in the embodiments of the present invention.

An embodiment of the present invention further introduces a wireless network management entity. With reference to FIG. 11, an embodiment of the wireless network management entity includes:

an information receiving unit 1101, configured to receive a consulting message for D2D communication between terminals that is sent directly or forwarded by an access point, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals;

a calculating unit 1102, configured to calculate, according to device information of the terminals received by the information receiving unit 1101, the performance evaluation parameter for D2D communication between terminals, where the device information includes capability information and location information of the terminals, where the capability information of the terminals includes supported radio access technologies, supported frequency ranges, and maximum transmit powers of the terminals;

a parameter sending unit 1103, configured to send, to the access point, the performance evaluation parameter for D2D communication between the terminals obtained by the calculating unit 1102 by calculation.

In this embodiment, the performance evaluation parameter for D2D communication between the terminals received by the information receiving unit 1101 includes: configuration information related to D2D communication, a propagation model of D2D communication, ambient noise, receive powers of the terminals in a D2D communication state, interference powers received by the terminals, and signal-to-noise ratios of the terminals in a D2D communication state, where the capability information of the terminals includes supported radio access technologies, supported frequency ranges, and maximum transmit powers of the terminals.

For a process of implementing a respective function of each unit of the wireless network management entity in this embodiment of the present invention, reference may be made to the specific description in the foregoing embodiment shown in the FIG. 3, which is not described herein again.

In this embodiment of the present invention, an information receiving unit 1101 receives a consulting message for D2D communication between terminals that is sent directly or forwarded by an access point, and requests a wireless network management entity to query a performance evaluation parameter for D2D communication between the terminals; a calculating unit 1102 calculates, according to received device information of the terminals, the performance evaluation parameter for D2D communication between terminals; and a parameter sending unit 1103 is configured to send, to the access point, the performance evaluation parameter for D2D communication between the terminals, which provides determining basis for determining, by a base station, whether to perform measurement, and sends a calculation result to the base station. Calculation is performed in view of a radio access technology of a UE, which avoids separate calculation, by the UE, of time consumption and electricity consumption under every radio access technology.

For ease of understanding, the following introduces in detail a wireless network management entity according to an embodiment of the present invention. With reference to FIG. 11 again, another embodiment of the wireless network management entity in the embodiments of the present invention includes:

an information receiving unit 1101, configured to receive a consulting message for D2D communication between terminals that is sent directly or forwarded by an access point, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals;

a calculating unit 1102, configured to calculate, according to device information of the terminals received by the information receiving unit, the performance evaluation parameter for D2D communication between the terminals, where the device information includes capability information and location information of the terminals; and a parameter sending unit 1103, configured to send, to the access point, the performance evaluation parameter for D2D communication between the terminals obtained by the calculating unit by calculation.

In this embodiment, the performance evaluation parameter for D2D communication between the terminals received by the information receiving unit 1101 includes: configuration information related to D2D communication, a propagation model of D2D communication, ambient noise, receive powers of the terminals in a D2D communication state, interference powers received by the terminals, and signal-to-noise ratios of the terminals in a D2D communication state, where the capability information of the terminals includes supported radio access technologies, supported frequency ranges, and maximum transmit powers of the terminals.

Further, the calculating unit 1102 is further configured to determine, according to the capability information of the terminals, the configuration information related to D2D communication, where the configuration information includes radio access technologies, frequency ranges, and transmit powers that are used by the terminals.

The calculating unit 1102 is further configured to determine, according to the location information of the terminals, prestored information about wireless communication environments around the terminals, and the configuration information, the propagation model of D2D communication between the terminals, where the information about wireless communication environments around the terminals includes information about buildings, vegetation, co-channel interference sources, adjacent-channel interference sources, and ambient noise around the terminals.

The calculating unit 1102 is further configured to obtain, by calculation, the receive powers of the terminals in a D2D communication state according to the propagation model of D2D communication between the terminals and the transmit powers used by the terminals.

Still further, the calculating unit 1102 is further configured to separately determine a propagation model between the co-channel interference sources and the terminals and a propagation model between the adjacent-channel interference sources and the terminals according to the location information of the terminals, the information about wireless communication environments around the terminals, and the configuration information.

The calculating unit 1102 is further configured to obtain, by calculation according to the propagation model between the co-channel interference sources and the terminals, the propagation model between the adjacent-channel interference sources and the terminals, transmit powers of the co-channel interference sources, and transmit powers of the adjacent-channel interference sources, the interference powers received by the terminals.

The calculating unit 1102 is further configured to obtain, by calculation, the signal-to-noise ratios of the terminals in a D2D communication state according to the receive powers, interference powers, and ambient noise of the terminals.

The information receiving unit 1102 is further configured to receive the device information of the terminals sent by the access point or the terminals, where the device information of the terminals includes the capability information and location information of the terminals, where the capability information of the terminals includes supported radio access technologies, supported frequency ranges, and maximum transmit powers of the terminals.

For a process of implementing a respective function of each unit of the wireless network management entity in this embodiment of the present invention, reference may be made to the specific description in the foregoing embodiment shown in the FIG. 4, which is not described herein again.

In this embodiment of the present invention, an information receiving unit 1102 receives device information of terminals sent by an access point or the terminals, and receives a consulting message for D2D communication between the terminals that is sent directly or forwarded by the access point. A calculating unit 1102 calculates, according to the device information of the terminals received by the information receiving unit 1101, a performance evaluation parameter for D2D communication between the terminals. Specifically, the calculating unit 1102 determines, according to capability information of the terminals, configuration information related to D2D communication. Then the calculating unit 1102 determines, according to location information of the terminals, prestored information about wireless communication environments around the terminals, and the configuration information, a propagation model of D2D communication between the terminals. The calculating unit 1102 obtains, by calculation, receive powers of the terminals in a D2D communication state according to the propagation model of D2D communication between the terminals and transmit powers used by the terminals. Then, the calculating unit 1102 separately determines a propagation model between a co-channel interference source and the terminals and a propagation model between an adjacent-channel interference source and the terminals according to the location information of the terminals, the information about wireless communication environments around the terminals, and the configuration information. The calculating unit 1102 obtains, by calculation according to the propagation model between the co-channel interference sources and the terminals, the propagation model between the adjacent-channel interference sources and the terminals, transmit powers of the co-channel interference sources, and transmit powers of the adjacent-channel interference sources, the interference powers received by the terminals. The calculating unit 1102 obtains, by calculation, a signal-to-noise ratio of the terminals in a D2D communication state according to the receive power, the power of the interference, and ambient noise that are of the terminals. The parameter sending unit 1103 sends, to the access point, the performance evaluation parameter for D2D communication between the terminals obtained by the calculating unit by calculation; obtains, by calculation according to the device information and the location information of the terminals, the configuration information related to D2D communication between the terminals; feeds back the receive power and the receive signal-to-noise ratio that are of a first UE and a second UE and are obtained by calculation to the access point, which provides determining basis for determining, by the access point, whether to perform measurement; and sends a calculation result to the access point. Calculation is performed in view of a radio access technology of a UE, which avoids separate calculation, by the UE, of time consumption and electricity consumption under every radio access technology.

Figure 12:
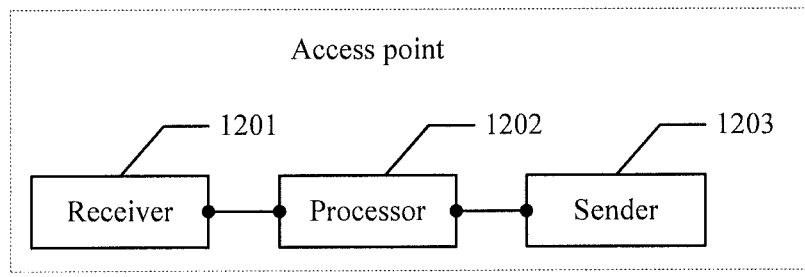
FIG. 12 is a schematic diagram of another embodiment of the wireless network management entity in the embodiments of the present invention.

With reference to FIG. 12, another embodiment of an access point in the embodiments of the present invention includes:

a sender 1201, a receiver 1202, and a processor 1203.

The sender 1201 is configured to send directly or forward, to a wireless network management entity, a consulting message for D2D communication between terminals, where the consulting message is used to request the wireless network management entity to calculate a performance evaluation parameter for D2D communication between the terminals, where the performance evaluation parameter for D2D communication between the terminals is used to evaluate feasibility of measurement for D2D communication between the terminals.

The receiver 1202 is configured to receive a performance evaluation parameter for D2D communication between the terminals that is sent by the wireless network management entity.

The processor 1203 is configured to determine, according to the performance evaluation parameter for D2D communication between the terminals, to perform the measurement for D2D communication between the terminals and perform measurement configuration for the terminals, and determine, according to a result of the measurement for D2D communication between the terminals, to perform D2D communication between the terminals.

In this embodiment, a sender 1201 of an access point sends directly or forwards, to a wireless network management entity, a consulting message for D2D communication between terminals; a processor 1203 determines, according to a performance evaluation parameter for D2D communication between the terminals received by a receiver 1202, to perform measurement for D2D communication between the terminals and perform measurement configuration for the terminals, and determines, according to a result of the measurement for D2D communication between the terminals, to perform D2D communication between the terminals. In this way, the performance evaluation parameter obtained by the wireless network management entity by calculation is used to filter out an invalid communication request for D2D communication between the terminals that does not meet an expectation, instead of performing measurement for all requests for D2D communication between the terminals, so as to save time for D2D communication between the terminals and save bandwidth resources.

Figure 13:
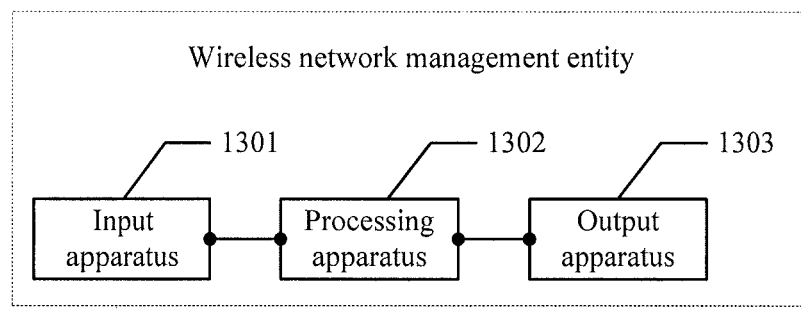
FIG. 13 is a schematic diagram of another embodiment of the wireless network management entity in the embodiments of the present invention.

With reference to FIG. 13, another embodiment of a wireless network management entity in the embodiments of the present invention includes:

an input apparatus 1301, a processing apparatus 1302, and an output apparatus 1303.

The input apparatus 1301 is configured to receive a consulting message for D2D communication between terminals that is sent directly or forwarded by an access point, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals.

The processing apparatus 1302 is configured to calculate, according to device information of the terminals received by an information receiving unit, the performance evaluation parameter for D2D communication between the terminals, where the device information includes capability information and location information of the terminals.

The output apparatus 1303 is configured to send, to the access point, the performance evaluation parameter for D2D communication between the terminals.

In this embodiment of the present invention, an input apparatus of a wireless network management entity receives a consulting message for D2D communication between terminals that is sent directly or forwarded by an access point; a processing apparatus 1302 calculates, according to device information of the terminals received by an information receiving unit, a performance evaluation parameter for D2D communication between the terminals; and an output apparatus 1303 sends, to the access point, the calculated performance evaluation parameter for D2D communication between the terminals. After receiving the consulting message for D2D communication, the wireless network management entity calculates, according to the received device information of the terminals, the performance evaluation parameter of a connection request for D2D communication between the terminals, which provides determining basis for determining, by the access point, whether to perform measurement; and sends a calculation result to the access point. The wireless network management entity performs calculation in view of a radio access technology of a UE, which avoids separate calculation, by the UE, of time consumption and electricity consumption under every radio access technologies.

Figure 14:
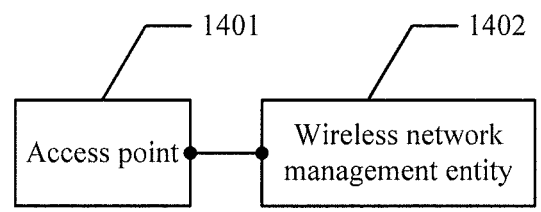
FIG. 14 is a schematic diagram of an embodiment of a system for measurement for D2D communication in the embodiments of the present invention.

An embodiment of the present invention further describes a system for measurement for D2D communication. With reference to FIG. 14, an embodiment of the system for measurement for D2D communication in the embodiments of the present invention includes:

an access point 1401 and a wireless network management entity 1402.

The access point 1401 includes a sending unit, configured to send directly or forward, to a wireless network management entity, a consulting message for D2D communication between terminals, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals; a receiving unit, configured to receive a performance evaluation parameter for D2D communication between the terminals that is sent by the wireless network management entity; and a determining unit, configured to determine, according to the performance evaluation parameter for D2D communication between the terminals that is received by the receiving unit, to perform the measurement for D2D communication between the terminals, and perform measurement configuration for the terminals, where the determining unit is further configured to determine, according to a result of the measurement for D2D communication between the terminals, to perform D2D communication between the terminals.

The wireless network management entity 1402 includes an information receiving unit, configured to receive a consulting message for D2D communication between terminals that is sent directly or forwarded by an access point, where the consulting message is used to request the wireless network management entity to query a performance evaluation parameter for D2D communication between the terminals, where the performance evaluation parameter for D2D communication between the terminals is used to evaluate feasibility of measurement for D2D communication between the terminals; a calculating unit, configured to calculate, according to device information of the terminals received by the information receiving unit, the performance evaluation parameter for D2D communication between the terminals, where the device information includes capability information and location information of the terminals; and a parameter sending unit, configured to send, to the access point, the performance evaluation parameter for D2D communication between the terminals obtained by the calculating unit by calculation.

For a process of implementing a function of an access point and wireless network management entity in the system for measurement for D2D communication in this embodiment of the present invention, reference may be made to the specific description in the foregoing embodiments shown in FIG. 1 to FIG. 13, which is not described herein again.

A person of skill in the art may understand that all or a part of the steps of the methods in the embodiments may be implemented by a program instructing relevant hardware. The program may be stored in a computer readable storage medium. The storage medium may include: a read-only memory, a magnetic disc, or an optical disc.

The foregoing describes in detail a method, apparatus, and system for measurement for D2D communication. With respect to the implementation manners and the application scope, modifications may be made by a person skilled in the art according to the idea of the present invention. Therefore, this specification shall not be construed as a limitation on the present invention.

What is claimed is:

1. A method for measurement for D2D communication, comprising:

sending directly or forwarding, by an evolved NodeB to a wireless network management entity, a consulting message for D2D communication between terminals, wherein the consulting message is used to request the wireless network management entity to calculate a performance evaluation parameter for D2D communication between the terminals, wherein the performance evaluation parameter for D2D communication between the terminals is used to evaluate feasibility of measurement for D2D communication between the terminals;

receiving a performance evaluation parameter for D2D communication between the terminals that is sent by the wireless network management entity;

determining, according to the performance evaluation parameter for D2D communication between the terminals, to perform the measurement for D2D communication between the terminals, and performing measurement configuration for the terminals; and determining, according to a result of the measurement for D2D communication between the terminals, to perform D2D communication between the terminals.

2. The method according to claim 1, wherein the performance evaluation parameter for D2D communication between the terminals comprises: configuration information related to D2D communication, a propagation model of D2D communication, ambient noise, receive powers of the terminals in a D2D communication state, interference powers received by the terminals, and signal-to-noise ratios of the terminals in a D2D communication state.

3. The method according to claim 1, wherein the determining, according to the performance evaluation parameter for D2D communication between the terminals, to perform the measurement for D2D communication between the terminals comprises:

determining whether a value of the performance evaluation parameter for D2D communication between the terminals is greater than a preset threshold of the performance parameter; and if the value of the performance evaluation parameter for D2D communication between the terminals is greater than the preset threshold of the performance parameter, determining to perform the measurement for D2D communication between the terminals.

4. The method according to claim 3, wherein before the sending directly or forwarding, to a wireless network management entity, a consulting message for D2D communication between terminals, the method comprises:

acquiring device information of an attached terminal, wherein the device information of the terminal comprises capability information and location information of the terminal, wherein the capability information of the terminal comprises a supported radio access technology, a supported frequency range, and a maximum transmit power of the terminal; and sending the device information of the terminal to the wireless network management entity.

5. The method according to claim 4, wherein the acquiring device information of an attached terminal comprises:

periodically receiving the device information reported by the attached terminal;

or in a process that the attached terminal establishes, with another terminal, data communication that is based on the evolved NodeB itself, acquiring the device information reported by the attached terminal.

6. A method for measurement for D2D communication, comprising:

receiving, by a wireless network management entity, a consulting message for D2D communication between terminals that is sent directly or forwarded by an evolved NodeB, wherein the consulting message is used to request the wireless network management entity to calculate a performance evaluation parameter for D2D communication between the terminals, wherein the performance evaluation parameter for D2D communication between the terminals is used to evaluate feasibility of measurement for D2D communication between the terminals;

calculating, according to received device information of the terminals, the performance evaluation parameter for D2D communication between the terminals, wherein the device information comprises capability information and location information of the terminals; and sending, to the evolved NodeB, the performance evaluation parameter for D2D communication between the terminals.

7. The method according to claim 6, wherein:

the performance evaluation parameter for D2D communication between the terminals comprises: configuration information related to D2D communication, a propagation model of D2D communication, ambient noise, receive powers of the terminals in a D2D communication state, interference powers received by the terminals, and signal-to-noise ratios of the terminals in a D2D communication state; and the capability information of the terminals comprises supported radio access technologies, supported frequency ranges, and maximum transmit powers of the terminals.

8. The method according to claim 7, wherein the calculating, according to device information of the terminals, the performance evaluation parameter for D2D communication between the terminals comprises:

determining, according to the capability information of the terminals, the configuration information related to D2D communication, wherein the configuration information comprises radio access technologies, frequency ranges, and transmit powers that are used by the terminals;

determining, according to the location information of the terminals, prestored information about wireless communication environments around the terminals, and the configuration information, the propagation model of D2D communication between the terminals, wherein the information about wireless communication environments around the terminals comprises information about buildings, vegetation, co-channel interference sources, adjacent-channel interference sources, and ambient noise around the terminals; and obtaining, by calculation, the receive powers of the terminals in a D2D communication state according to the propagation model of D2D communication between the terminals and the transmit powers used by the terminals.

9. The method according to claim 8, wherein if a terminal supports multiple radio access technologies and frequency ranges at the same time, after the obtaining, by calculation, the receive powers of the terminals in a D2D communication state according to the propagation model of D2D communication between the terminals and the transmit powers used by the terminals, the method comprises:

separately determining a propagation model between the co-channel interference sources and the terminals and a propagation model between the adjacent-channel interference sources and the terminals according to the location information of the terminals, the information about wireless communication environments around the terminals, and the configuration information;

obtaining, by calculation according to the propagation model between the co-channel interference sources and the terminals, the propagation model between the adjacent-channel interference sources and the terminals, transmit powers of the co-channel interference sources, and transmit powers of the adjacent-channel interference sources, the interference powers received by the terminals; and obtaining, by calculation, the signal-to-noise ratios of the terminals in a D2D communication state according to the receive powers, interference powers, and ambient noise of the terminals.

10. The method according to claim 6, wherein before the receiving a consulting message for D2D communication between terminals that is sent directly or forwarded by an evolved NodeB, the method comprises:

receiving the device information of the terminals sent by the evolved NodeB or the terminals, wherein the device information of the terminals comprises the capability information and location information of the terminals, wherein the capability information of the terminals comprises supported radio access technologies, supported frequency ranges, and maximum transmit powers of the terminals.

11. An evolved NodeB, comprising:

a sending unit, configured to send directly or forward, to a wireless network management entity, a consulting message for D2D communication between terminals, wherein the consulting message is used to request the wireless network management entity to query a performance evaluation parameter for D2D communication between the terminals, wherein the performance evaluation parameter for D2D communication between the terminals is used to evaluate feasibility of measurement for D2D communication between the terminals;

a receiving unit, configured to receive a performance evaluation parameter for D2D communication between the terminals that is sent by the wireless network management entity; and a determining unit, configured to determine, according to the performance evaluation parameter for D2D communication between the terminals that is received by the receiving unit, to perform the measurement for D2D communication between the terminals, and perform measurement configuration for the terminals, wherein the determining unit is further configured to determine, according to a result of the measurement for D2D communication between the terminals, to perform D2D communication between the terminals.

12. The evolved NodeB according to claim 11, wherein the evolved NodeB further comprises:

a judging unit, configured to determine whether a value of the performance evaluation parameter for D2D communication between the terminals that is received by the receiving unit is greater than a preset threshold of the performance parameter; and the determining unit is configured to, if the judging unit determines that the value of the performance evaluation parameter for D2D communication between the terminals is greater than the preset threshold of the performance parameter, determine to perform the measurement for D2D communication between the terminals.

13. The evolved NodeB according to claim 11, wherein the evolved NodeB further comprises:

an acquiring unit, configured to acquire device information of an attached terminal, wherein the device information of the terminal comprises capability information and location information of the terminal, wherein the capability information of the terminal comprises a supported radio access technology, a supported frequency range, and a maximum transmit power of the terminal; and the sending unit is further configured to send the device information of the terminal acquired by the acquiring unit to the wireless network management entity.

14. The evolved NodeB according to claim 13, wherein:

the receiving unit is further configured to periodically receive the device information reported by the attached terminal; and the acquiring unit is further configured to acquire, in a process that the attached terminal establishes, with another terminal, data communication that is based on the evolved NodeB itself, the device information reported by the attached terminal.

15. A wireless network management entity, comprising:

an information receiving unit, configured to receive a consulting message for D2D communication between terminals that is sent directly or forwarded by an evolved NodeB, wherein the consulting message is used to request the wireless network management entity to query a performance evaluation parameter for D2D communication between the terminals, wherein the performance evaluation parameter for D2D communication between the terminals is used to evaluate feasibility of measurement for D2D communication between the terminals;

a calculating unit, configured to calculate, according to device information of the terminals received by the information receiving unit, the performance evaluation parameter for D2D communication between the terminals, wherein the device information comprises capability information and location information of the terminals; and a parameter sending unit, configured to send, to the evolved NodeB, the performance evaluation parameter for D2D communication between the terminals obtained by the calculating unit by calculation.

16. The wireless network management entity according to claim 15, wherein the performance evaluation parameter for D2D communication between the terminals received by the information receiving unit comprises: configuration information related to D2D communication, a propagation model of D2D communication, ambient noise, receive powers of the terminals in a D2D communication state, interference powers received by the terminals, and signal-to-noise ratios of the terminals in a D2D communication state, wherein the capability information of the terminals comprises supported radio access technologies, supported frequency ranges, and maximum transmit powers of the terminals.

17. The wireless network management entity according to claim 15, wherein:

the calculating unit is further configured to determine, according to the capability information of the terminals, configuration information related to D2D communication, wherein the configuration information comprises radio access technologies, frequency ranges, and transmit powers that are used by the terminals;

the calculating unit is further configured to determine, according to the location information of the terminals, prestored information about wireless communication environments around the terminals, and the configuration information, the propagation model of D2D communication between the terminals, wherein the information about wireless communication environments around the terminals comprises information about buildings, vegetation, co-channel interference sources, adjacent-channel interference sources, and ambient noise around the terminals; and the calculating unit is further configured to obtain, by calculation, the receive powers of the terminals in a D2D communication state according to the propagation model of D2D communication between the terminals and the transmit powers used by the terminals.

18. The wireless network management entity according to claim 17, wherein:

the calculating unit is further configured to separately determine a propagation model between the co-channel interference sources and the terminals and a propagation model between the adjacent-channel interference sources and the terminals according to the location information of the terminals, the information about wireless communication environments around the terminals, and the configuration information;

the calculating unit is further configured to obtain, by calculation according to the propagation model between the co-channel interference sources and the terminals, the propagation model between the adjacent-channel interference sources and the terminals, transmit powers of the co-channel interference sources, and transmit powers of the adjacent-channel interference sources, the interference powers received by the terminals; and the calculating unit is further configured to obtain, by calculation, the signal-to-noise ratios of the terminals in a D2D communication state according to the receive powers, interference powers, and ambient noise of the terminals.

19. The wireless network management entity according to claim 18, wherein:

the information receiving unit is further configured to receive the device information of the terminals sent by the evolved NodeB or the terminals, wherein the device information of the terminals comprises the capability information and location information of the terminals, wherein the capability information of the terminals comprises supported radio access technologies, supported frequency ranges, and maximum transmit powers of the terminals.

* * * * *